US005293593A

United States Patent [19]

Hodge et al.

[11] Patent Number: 5,293,593

[45] Date of Patent: Mar. 8, 1994

[54] METHOD AND APPARATUS FOR THE MAPPING OF PHYSICALLY NON-CONTIGUOUS MEMORY FRAGMENTS TO BE LINEARLY ADDRESSABLE

[75] Inventors: David J. Hodge; John C. Keith, both of Loveland; Lief J. Sorensen; Steven P. Tucker, both of Fort Collins, all of Colo.

[73] Assignee: Hewlett-Packard Company, Palo Alto, Calif.

[21] Appl. No.: 596,176

[22] Filed: Oct. 11, 1990

[51] Int. Cl.[5] .............................................. G06F 12/02

[52] U.S. Cl. ............................ 395/400; 364/DIG. 1; 364/246.3

[58] Field of Search ... 364/200 MS File, 900 MS File; 395/400, 425

[56] References Cited

U.S. PATENT DOCUMENTS

| | | | |
|---|---|---|---|
| 4,511,964 | 4/1985 | Georg et al. | 395/400 |
| 4,672,538 | 6/1987 | Takane | 395/400 |
| 4,774,652 | 9/1988 | Dhuey et al. | 395/400 |
| 4,860,252 | 8/1989 | Sykora | 395/400 |
| 4,933,877 | 6/1990 | Hasebe | 395/166 |
| 4,942,541 | 7/1990 | Hoel et al. | 395/115 |
| 5,113,492 | 3/1992 | Ariki et al. | 395/147 |
| 5,146,571 | 9/1992 | Logan | 395/400 |

OTHER PUBLICATIONS

Horowitz, et al., The Art of Electronics (2nd Edition), New York, Press Syndicate of the University of Cambridge 1989, pp. 813-816.

*Primary Examiner*—Joseph L. Dixon
*Assistant Examiner*—Hiep T. Nguyen

[57] ABSTRACT

A method and apparatus for use in read/write operations by a processor that reads and writes information in first and second address formats. The method and apparatus include a memory and a memory mapper for remapping according to a predetermined scheme those memory fragments not containing information stored in the first address format. Memory fragments are thus accessible to the processor for reading and writing information in the second address format. Such remapping operation results in the memory fragments appearing logically contiguous. In the preferred embodiment, the first address format is an x-y address format and the second address format is a linearly addressable format. An alternative embodiment discloses the use of a second memory for reading and writing information in the second address format. In that embodiment, the memory mapper remaps the memory fragments to appear logically contiguous with said second memory. The invention finds particular utility in conjunction with a graphics processor system. In such a system, the memory mapper is a programmable array logic device and the memory is VRAM memory. In certain situations it is preferred to remap that portion of the memory where information is to be stored in the first address format so that the first information signal is stored in locations which are physically contiguous.

20 Claims, 8 Drawing Sheets

DISPLAY VRAM PHYSICAL ADDRESS MAPPING (32-bit words)
FOR 4 BITS PER PIXEL

| Addr 8 | Addr 7 | Addr 6 | Addr 5 | Cadd 8 | Cadd 7 | Cadd 6 | Cadd 5 |
|---|---|---|---|---|---|---|---|
| 0 | a | b | c | 0 | a | b | c |
| 1 | 0 | 0 | 0 | 0 | 1 | 0 | 1 |
| 1 | 0 | 0 | 1 | 0 | 1 | 1 | 0 |
| 1 | 0 | 1 | 0 | 0 | 1 | 1 | 1 |
| 1 | 0 | 1 | 1 | 1 | 0 | 0 | 0 |
| 1 | 1 | 0 | 0 | 1 | 0 | 0 | 1 |
| 1 | 1 | 0 | 1 | 1 | 0 | 1 | 0 |
| 1 | 1 | 1 | 0 | 1 | 0 | 1 | 1 |
| 1 | 1 | 1 | 1 | 1 | 1 | 0 | 0 |

OFFSCREEN VRAM PHYSICAL ADDRESS MAPPING
(32-bit words)

1024x768x8

| Addr 18 | Addr 17 | Addr 16 | Radd 8 | Radd 7 | STACK |
|---|---|---|---|---|---|
| 0 | 0 | 0 | x | x | x |
| 0 | 0 | 1 | x | x | x |
| 0 | 1 | 0 | x | x | x |
| 0 | 1 | 1 | 0 | 0 | 1 |
| 1 | 0 | 0 | 0 | 1 | 1 |
| 1 | 0 | 1 | 1 | 0 | 1 |
| 1 | 1 | 0 | 1 | 1 | 1 |
| 1 | 1 | 1 | 1 | 1 | 0 |

NOTE:
'STACK a' IS FOR THE CONFIGURATION WITH NO DOUBLE BUFFERING.
'STACK b' IS FOR THE CONFIGURATION WITH DOUBLE BUFFERING.
'STACK' REFERS TO EITHER CONFIGURATION.

RAdd 6-0 IS ACTUALLY MAPPED AS:

(A2 A1 A0 A5 A4 A3)

1024x768x4

| Addr 18 | Addr 17 | Addr 16 | Addr 15 | Radd 8 | Radd 7 | Radd 6 | STACK a | STACK b |
|---|---|---|---|---|---|---|---|---|
| 0 | 0 | 0 | 0 | x | x | x | x | x |
| 0 | 0 | 0 | 1 | x | x | x | x | x |
| 0 | 0 | 1 | 0 | x | x | x | x | x |
| 0 | 0 | 1 | 1 | 1 | 1 | 0 | 1 | x |
| 0 | 1 | 0 | 0 | 1 | 0 | 0 | 1 | x |
| 0 | 1 | 0 | 1 | 1 | 0 | 1 | 1 | x |
| 0 | 1 | 1 | 0 | 0 | 1 | 1 | 1 | 1 |
| 0 | 1 | 1 | 1 | 1 | 1 | 1 | 1 | 1 |
| 1 | 0 | 0 | 0 | 0 | 0 | 0 | 1 | 1 |
| 1 | 0 | 0 | 1 | 0 | 0 | 1 | 1 | 1 |
| 1 | 0 | 1 | 0 | 0 | 1 | 0 | 1 | 1 |
| 1 | 0 | 1 | 1 | 1 | 1 | 0 | 0 | 1 |
| 1 | 1 | 0 | 0 | 1 | 0 | 0 | 0 | 1 |
| 1 | 1 | 0 | 1 | 1 | 0 | 1 | 0 | 1 |
| 1 | 1 | 1 | 0 | 0 | 1 | 1 | 0 | 0 |
| 1 | 1 | 1 | 1 | 1 | 1 | 1 | 0 | 0 |

Fig. 14

| Addr 18 | Addr 17 | Addr 16 | Addr 15 | Cadd 8 | Cadd 7 | Cadd 6 | STACK |
|---|---|---|---|---|---|---|---|
| 0 | 0 | 0 | 0 | x | x | x | x |
| 0 | 0 | 0 | 1 | x | x | x | x |
| 0 | 0 | 1 | 0 | x | x | x | x |
| 0 | 0 | 1 | 1 | x | x | x | x |
| 0 | 1 | 0 | 0 | x | x | x | x |
| 0 | 1 | 0 | 1 | 0 | 1 | 0 | 1 |
| 0 | 1 | 1 | 0 | 0 | 0 | 1 | 1 |
| 0 | 1 | 1 | 1 | 0 | 1 | 1 | 1 |
| 1 | 0 | 0 | 0 | 0 | 0 | 0 | 1 |
| 1 | 0 | 0 | 1 | 1 | 0 | 0 | 1 |
| 1 | 0 | 1 | 0 | 1 | 0 | 1 | 1 |
| 1 |  | 1 | 1 | 1 | 1 | 1 | 1 |
| 1 | 1 | 0 | 0 | 1 | 1 | 0 | 1 |
| 1 | 1 | 0 | 1 | 1 | 1 | 0 | 0 |
| 1 | 1 | 1 | 0 | 1 | 0 | 1 | 0 |
| 1 | 1 | 1 | 1 | 1 | 1 | 1 | 0 |

Fig. 17

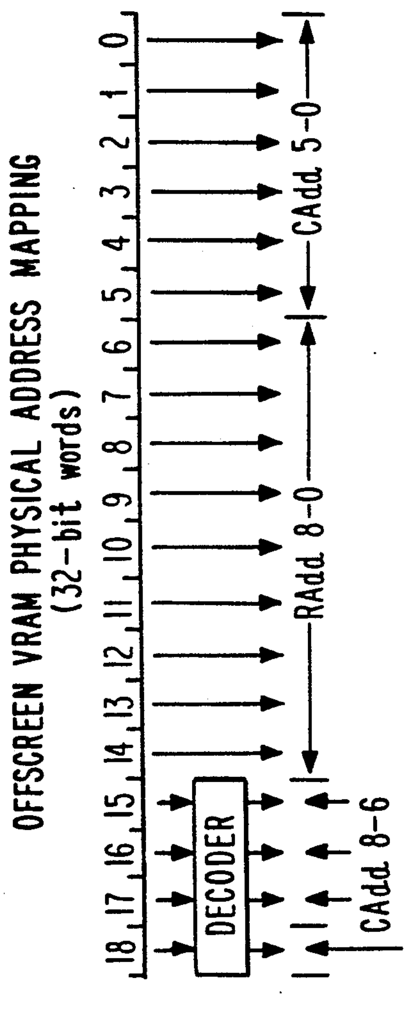

*Fig. 15*

LOGICAL OFFSCREEN ADDR
(assume no DRAM offset)
(1280x1024x4)

| | | | | | |
|---|---|---|---|---|---|
| 0 | = | 0xFFF0 0000 | to | 0xFFFF FFFF |
| 1 | = | 0xFFE0 0000 | to | 0xFFEF FFFF |
| 2 | = | 0xFFD0 0000 | to | 0xFFDF FFFF |
| 3 | = | 0xFFC0 0000 | to | 0xFFCF FFFF |
| 4 | = | 0xFFB0 0000 | to | 0xFFBF FFFF |
| 5 | = | 0xFFA0 0000 | to | 0xFFAF FFFF |
| 6 | = | 0xFF90 0000 | to | 0xFF9F FFFF |
| 7 | = | 0xFF80 0000 | to | 0xFF8F FFFF |
| 8 | = | 0xFF70 0000 | to | 0xFF7F FFFF |
| 9 | = | 0xFF60 0000 | to | 0xFF6F FFFF |
| 10 | = | 0xFF50 0000 | to | 0xFF5F FFFF |

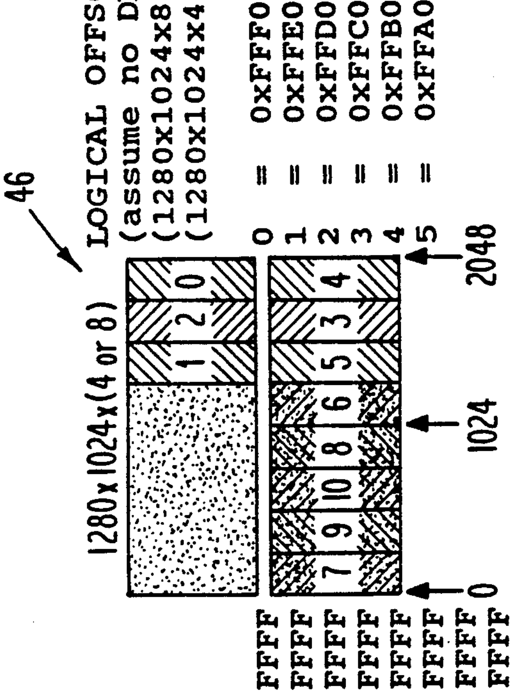

LOGICAL OFFSCREEN ADDR
(assume no DRAM offset)
(1280x1024x8 or)
(1280x1024x4 DBUF)

| | | | | |
|---|---|---|---|---|
| 0 | = | 0xFFF0 0000 | to | 0xFFFF FFFF |
| 1 | = | 0xFFE0 0000 | to | 0xFFEF FFFF |
| 2 | = | 0xFFD0 0000 | to | 0xFFDF FFFF |
| 3 | = | 0xFFC0 0000 | to | 0xFFDF FFFF |
| 4 | = | 0xFFB0 0000 | to | 0xFFBF FFFF |
| 5 | = | 0xFFA0 0000 | to | 0xFFAF FFFF |

*Fig. 16*

METHOD AND APPARATUS FOR THE MAPPING OF PHYSICALLY NON-CONTIGUOUS MEMORY FRAGMENTS TO BE LINEARLY ADDRESSABLE

FIELD OF THE INVENTION

The present invention relates generally to the field of microprocessors and their use of random access memory and particularly to reading and writing graphics primitive information and program execution information in random access memory by graphics processors.

BACKGROUND OF THE INVENTION

Computer graphics products are now available which allow the researcher to study or view various types of data on a display screen. Such graphic systems typically incorporate a graphics processing unit (GPU) in conjunction with several types of memory as well as various latches, buffers and transceivers. The graphics system is generally utilized in relation to a host processor. The host processor generates the "raw data" which the graphics system places into a desirable video format for display purposes.

One such system has been developed in relation to the TMS34020 graphics processor manufactured and sold by Texas Instruments Corporation of Dallas, Tex. In that graphics display system, the GPU is connected via latching transceivers and buffers to separate video memory, dynamic program memory and static interface memory. The video memory includes a series of VRAMs arranged for parallel reception of display information generated by the GPU. The data stored in video memory is placed in serial form by way of a serial register and operated upon by a so-called palette device prior to final provision to a video device. The program memory is described as including a series of dynamic random access memory (DRAM) chips. The video memory is arranged in an x-y addressable format while the program memory is arranged for linear addressing. The program memory is intended for program execution information.

The problem with such graphics display systems is that not only are multiple memories provided for different address formatted information, but typically a good portion of the VRAM memory is wasted. As used herein, the term "display memory" refers to that portion of the memory which is utilized to store display type information and the term "offscreen memory" is used to refer to that portion of memory contained in the video memory which does not contain display information. Consider for the moment a 1280×1024 resolution display which utilizes eight bits per pixel. Such a display would most likely use two megabytes of VRAM in order to store display information in an x-y addressable block. Such a video memory will result in approximately 0.75 megabytes of useless offscreen memory. In the past, such memory has been used for x-y addressable purposes such as font storage, rectangular blits, etc. Consequently, the use of multiple memories with the resulting waste of offscreen memory is both inefficient and costly. Additionally, the use of dynamic ram in the program memory is not without its own difficulties, for example the use of multiplex addresses. See for example P. Horowitz, et al., The Art of Electronics (2nd Edition), New York, Press Syndicate of the University of Cambridge, 1989, p. 813–816.

It is noted that the TMS 34020 does support a so-called packed pixel array scheme by providing a mid-line reload capability which results in a contiguous unused memory beginning at the address after the last pixel. Using such a scheme, it may be possible to utilize the remaining memory for other purposes. Unfortunately, several problems result from such use. A strong penalty in graphics performance is incurred if the screen pitch is not a power of two. For example if the screen pitch were 1280, the packed pixel array scheme results in a 33% reduction in speed performance. Speed performance is worse if the screen pitch is not a sum of two numbers each of which are a power of two. Additionally, the packed pixel array scheme provides no mechanism for using unused portions of the video memory in a manner which is contiguous to any system memory.

Consequently, a need exists for a graphics system which maximizes memory usage, but yet is flexible enough to permit the use of additional memory devices.

SUMMARY OF THE INVENTION

The advantages of the invention are achieved in a method and apparatus for use in read/write operations by a processor that reads and writes information in first and second address formats. The method and apparatus include a memory and a memory mapper for remapping according to a predetermined scheme those memory fragments not containing information stored in the first address format. Memory fragments are thus accessible to the processor for reading and writing information in the second address format. Such remapping operation results in the memory fragments appearing logically contiguous. In the preferred embodiment, the first address format is an x-y address format and the second address format is a linearly addressable format. An alternative embodiment discloses the use of a second memory for reading and writing information in the second address format. In that embodiment, the memory mapper remaps the memory fragments to appear logically contiguous with said second memory. The invention finds particular utility in conjunction with a graphics processor system. In such a system, the memory mapper is a programmable array logic device and the memory is VRAM memory. In certain situations it is preferred to remap that portion of the memory where information is to be stored in the first address format so that the first information signal is stored in locations which are physically contiguous.

BRIEF DESCRIPTION OF THE DRAWINGS

The present invention will be better understood, and its numerous objects and advantages will become apparent to those skilled in the art by reference to the following detailed description of the invention when taken in conjunction with the following drawings, in which:

FIG. 14 are conversion tables for use in conjunction with the conversion chart shown in FIG. 11;

FIG. 15 is a conversion chart showing an alternative offscreen memory mapping scheme for use in the system shown in FIG. 1;

FIG. 16 is a diagrammatic view of information stored in the offscreen memory of FIG. 1 using the conversion chart of FIG. 15 when the memory is sized for a 1280×1024×8 or a 1280×1024×4 display; and FIG. 17 is a conversion table for use in conjunction with the conversion chart shown in FIG. 15.

DETAILED DESCRIPTION OF THE PREFERRED EMBODIMENT

Figure 1:
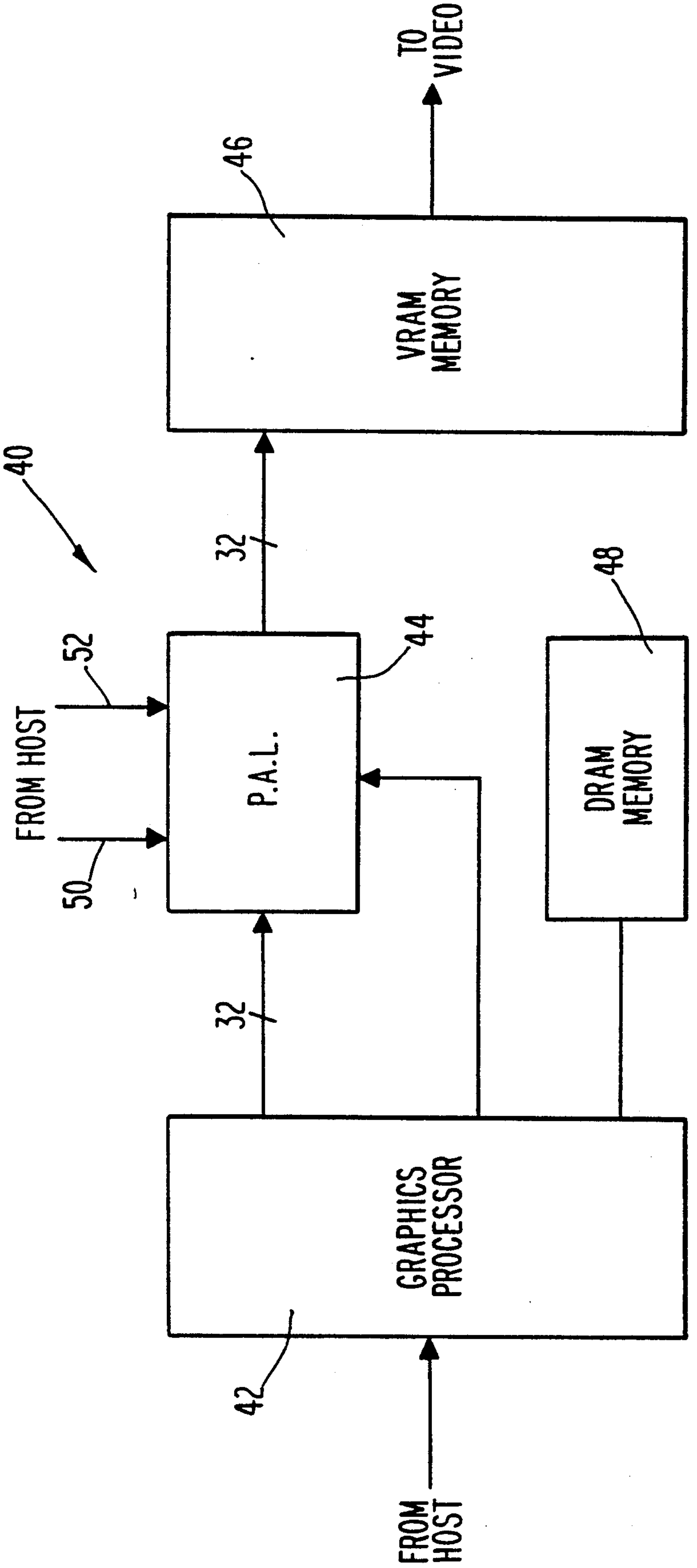
FIG. 1 is a block diagram of a graphics system constructed in accordance with the principles of the present invention.

A new and novel graphics system is shown in FIG. 1 and generally designated 40. System 40 is shown to include a graphics processor (GPU) 42, a programmable array logic (PAL) device 44 and a memory 46. In the preferred embodiment, graphics processor 42 is a TMS34020 graphics processor, PAL 44 includes one or more programmable array logic devices of the type such as a PAL 20L8 type. Also in the preferred embodiment, memory 46 includes 16 one megabyte VRAM devices arranged in a 2k×1k by 8 array.

It is noted that processor 42 reads and writes information in various address formats, for example, x-y addressable format and the linearly addressable format. It is the purpose of PAL 44 to remap according to a predetermined scheme those memory fragments in memory 46 which do not contain information stored in the x-y address format such that the memory fragments are accessible to processor 42 for reading and writing information in the linerally addressable format. Such remapping is accomplished by the conversion or rearrangement of the address portion of the signals output from processor 42. Such conversion is implemented through the use of PAL 44 which is programmed in any known manner to achieve the results described in greater detail in relation to FIGS. 2-17. By programming PAL 44 to achieve the results described below, PAL 44 remaps those memory fragments which do not contain information stored in the x-y addressable format such that those memory fragments appear logically contiguous. In other words, the remapping results in a portion of memory 46 being linerally addressable.

Under some circumstances it may be desirable to provide a second memory 48, which memory could include DRAM devices. In such a situation, the present invention operates such that memory fragments in memory 46 are remapped to appear logically contiguous with memory 48.

Figure 2:
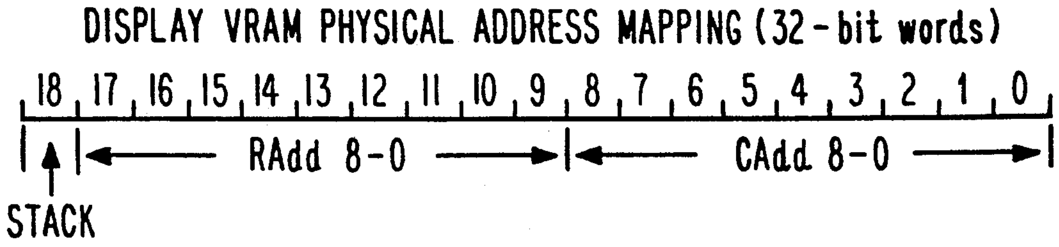
FIG. 2 is a conversion chart showing a display memory mapping scheme for use in the system shown in FIG. 1.

Referring now to FIG. 2, a conversion chart is shown for the physical address mapping of the display information, i.e. display VRAM, in memory 46. It will be appreciated from a review of the above that the goal of the invention is to gather memory fragments and in effect pack them onto existing linear memory, if available, such that processor 42 simply sees one large contiguous linear memory space. The portion of VRAM in memory 46 which is directly mapped to the display area is referred to herein as display VRAM memory. In nearly all cases, the mapping of this memory is in the traditional scheme, mainly, x-y address as the TMS34020 refers to it. As shown in FIG. 2, spaces 0 through 18 are the equivalent to address lines LAD23–LAD5 of the TMS34020. It will be understood that "LAD" signifies local address data. It will also be understood that RAdd and CAdd signify row address and column address respectively. The VRAM devices which make up memory 46 are addressed physically with the bits depicted as RAdd and CAdd. To this end, PAL 44 is remapping the address portion of the 32 bit word generated by processor 42. As shown in FIG. 1, PAL 44 receives two signals from a control register (not shown) at 50 and 52, which control register can be controlled by either the host controller or by graphics processor 42. The signal at 50 is an indication from the control register as to the size of the display. In examples shown herein, the display is sized any one of four ways, namely, 1024×768×4, 1024×768×8, 1280×1024×4 or 1280×1024×8. The signal at 52 signifies the amount of available memory in memory 48. For the purposes of FIGS. 2 through 17, it is assumed that memory 48 contains zero memory space.

Figure 3:
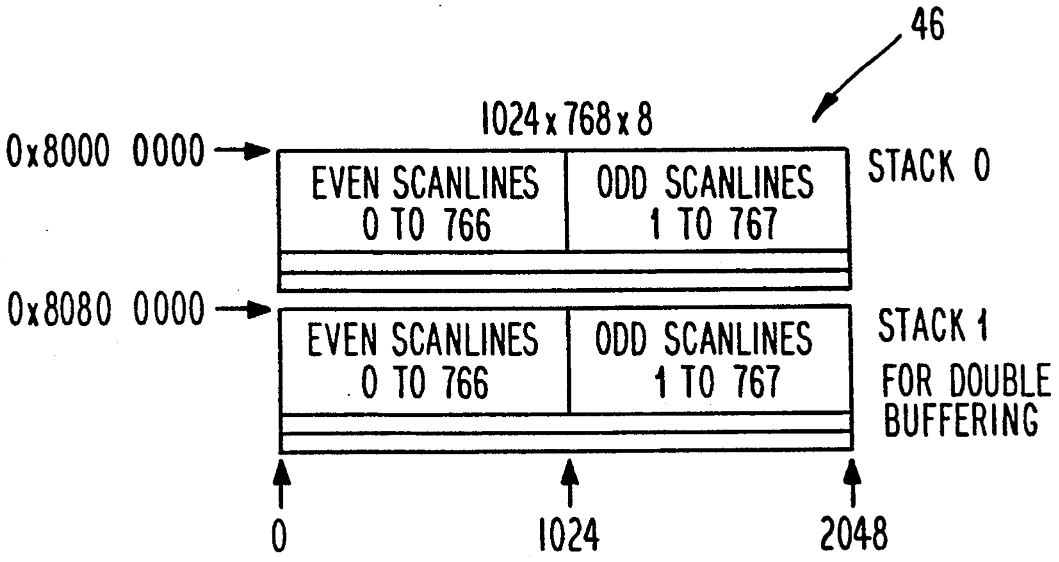
FIG. 3 is a diagrammatic view of information stored in the display memory of FIG. 1 using the conversion chart of FIG. 2 when the memory is sized for a 1024×768×8 display.

As shown in FIG. 3, information is to be stored in memory 46 in conjunction with a display which has been sized at 1024×768×8. It will be seen that the conversion chart of FIG. 2 utilized in conjunction with the TMS 34020 results in the display memory, i.e. even scan lines and odd scan lines, as being relatively contiguous. In other words, the unused portion of memory, the memory fragments, are physically contiguous.

Figure 4:
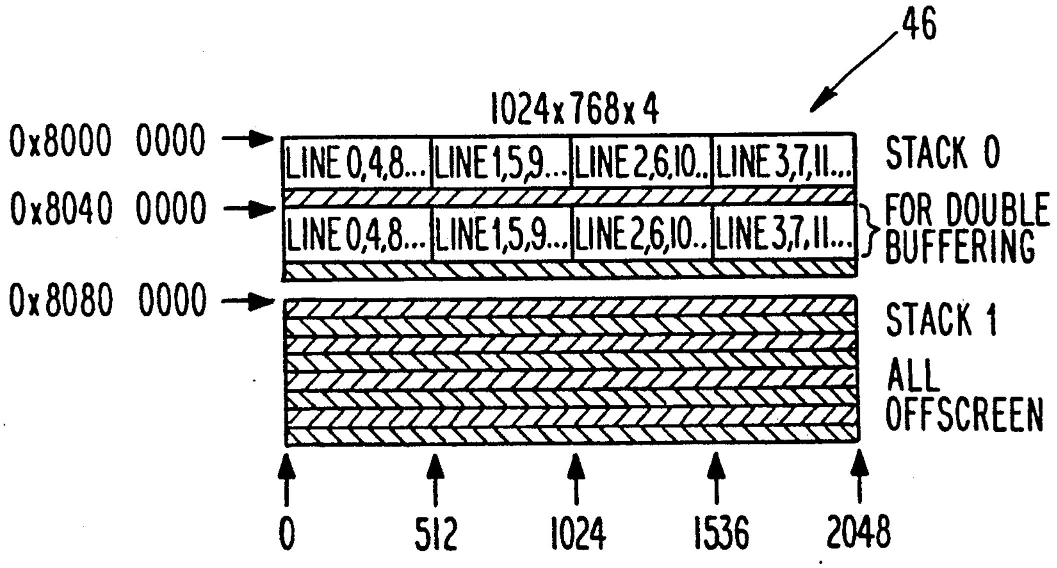
FIG. 4 is a diagrammatic view of information stored in the display memory of FIG. 1 using the conversion chart of FIG. 2 when the memory is sized for a 1024×768×4 display.

This is true even for STACK one, which is utilized in a double buffering schemes. As shown in FIG. 4, the display has been sized as 1024×768×4 which again results in very straight forward logical mapping of display VRAM space. In other words, the display VRAM space (no cross hatching) shown in FIGS. 3 and 4 is housed such that VRAM space appears to processor 42 utilizing the conversion chart shown in FIG. 2.

Figure 5:
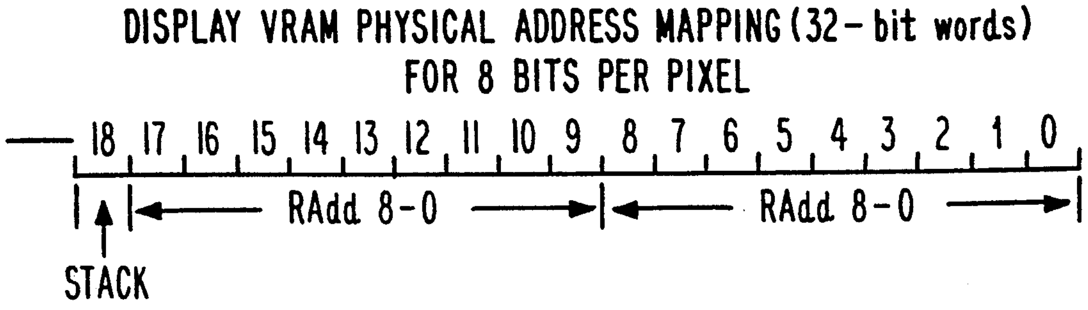
FIG. 5 is a conversion chart showing an alternative display memory mapping scheme for use in the system shown in FIG. 1.
Figure 6:
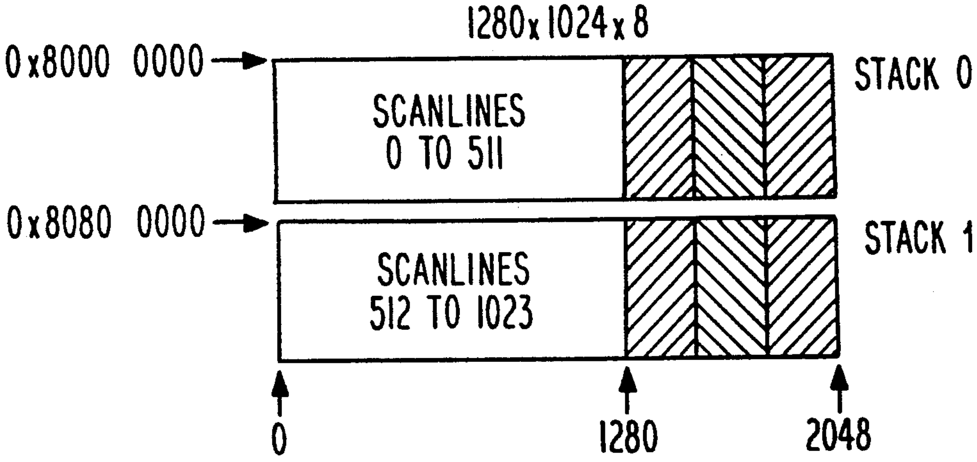
FIG. 6 is a diagrammatic view of information stored in the display memory of FIG. 1 using the conversion chart of FIG. 5 when the memory is sized for a 1280×1024×8 display.
Figure 7:
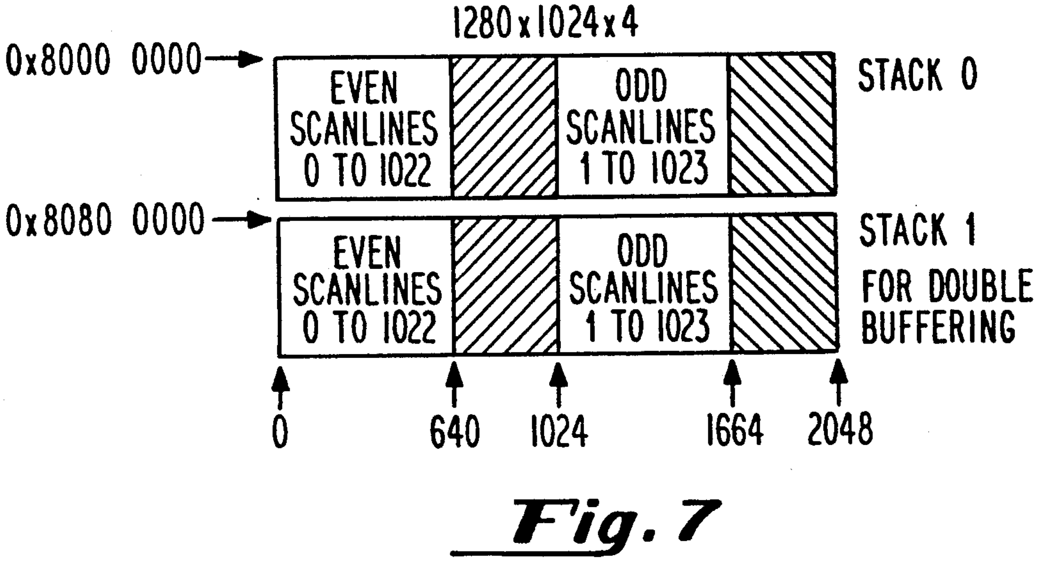
FIG. 7 is a diagrammatic view of information stored in the display memory of FIG. 1 using the conversion chart of FIG. 5 when the memory is sized for a 1280×1024×4 display.

Referring now to FIG. 5, the conversion chart is shown for use in relation to the mapping of display VRAM memory by PAL 44 for displays sized as 1280×1024×8. Utilization of such conversion chart results in the storage of display VRAM in a manner depicted in FIG. 6. In certain cases, for example, where processor 42 desires to store information for display area having a pitch of 1024 and a four bit per pixel mode, the offscreen memory is broken apart, i.e. becomes physically noncontiguous, as shown in FIG. 7. Such physically noncontiguous memory fragments are more difficult to remap. Consequently, it is preferred to additionally remap that portion of VRAM where information is to be stored in x-y address format so that such information is stored in locations which are physically contiguous. This is necessary in order to make use of page mode when accessing offscreen memory. In other words, it is desired to store information in display VRAM in a manner depicted in FIG. 8.

Figure 8:
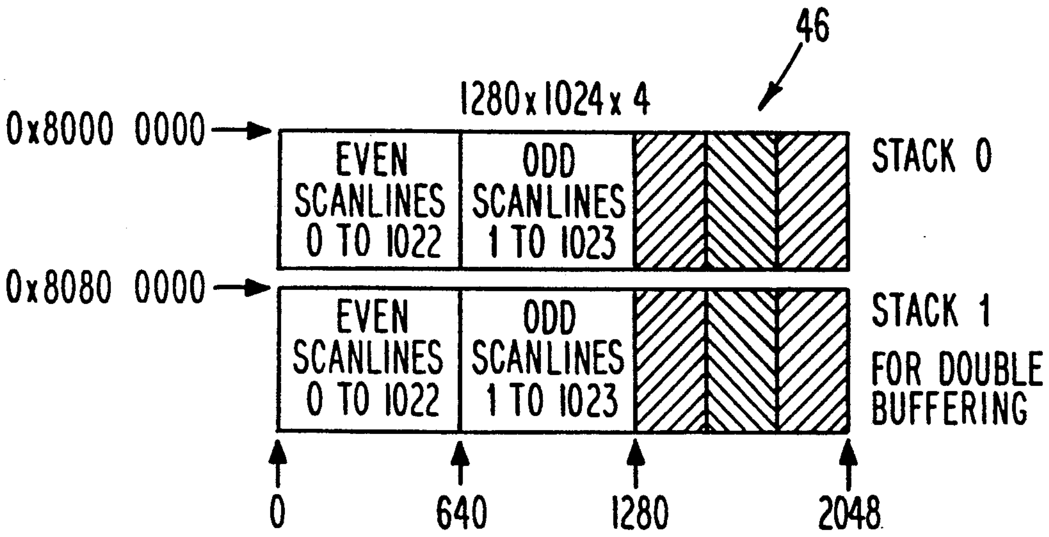
FIG. 8 is a diagrammatic view of desired information storage in the display memory of FIG. 1 when the memory is sized for a 1280×1024×4 display.
Figure 9:
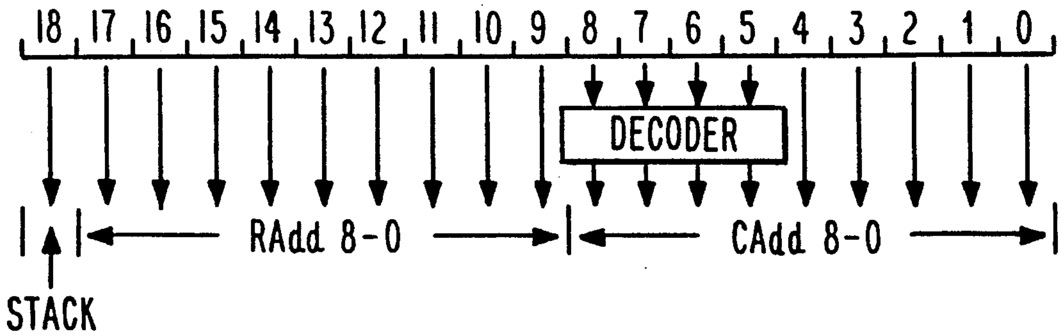
FIG. 9 is a conversion chart showing an alternative display memory mapping scheme for use in the system shown in FIG. 1 to achieve the memory storage shown in FIG. 8.

To this end, a conversion chart is shown in FIG. 9 for use in the remapping of display VRAM to achieve the results depicted in FIG. 8. In the conversion chart shown in FIG. 9 certain of the column address bits are converted. Such conversion is carried out in accordance with the function table shown in FIG. 10. Thus it will be appreciated that for the four display sizes described, the equations utilized by program PAL 44 are designed such that if operating in either of the 1024×768 modes or in the 1280×1024×8 mode the address generated by processor 42 for display VRAM is passed through. However, if operating in the 1280×1024×4 mode, the address portion of the signal generated by processor 42 is remapped according to the function table shown in FIG. 4, wherein the upper four column address inputs are modified. Consider the following example. If the bit values generated by processor 42 for address locations 8, 7, 6 and 5 is 1000, respectively, PAL 44 remaps the column address portions to be 0101, respectively. As a result of the above remapping scheme, offscreen VRAM is physically contiguous. The goal of the present invention, therefore becomes to remap the excess or offscreen VRAM such that it can be used as linear address space by processor 42. Such offscreen VRAM memory, as remapped, can be used for any linear address format, such as the storage of program execution information.

Figures 10, 11:
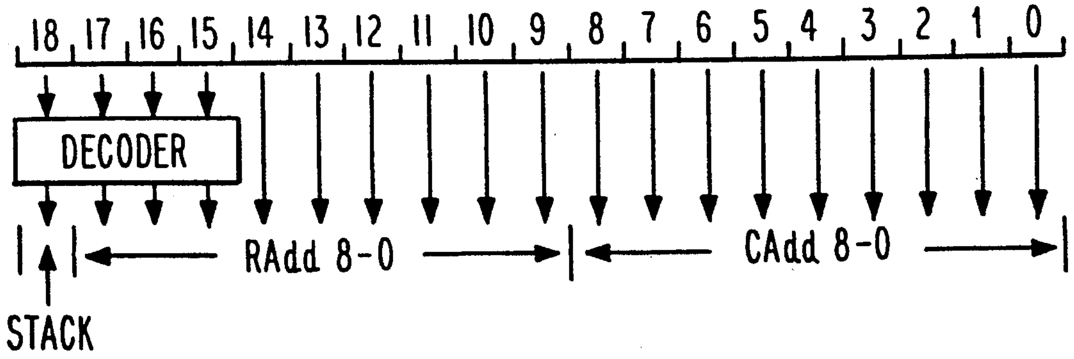
FIG. 10 is a conversion table for use in conjunction with the conversion chart shown in FIG. 9.
FIG. 11 is a conversion chart showing an offscreen memory mapping scheme for use in the system shown in FIG. 1.
Figure 12:
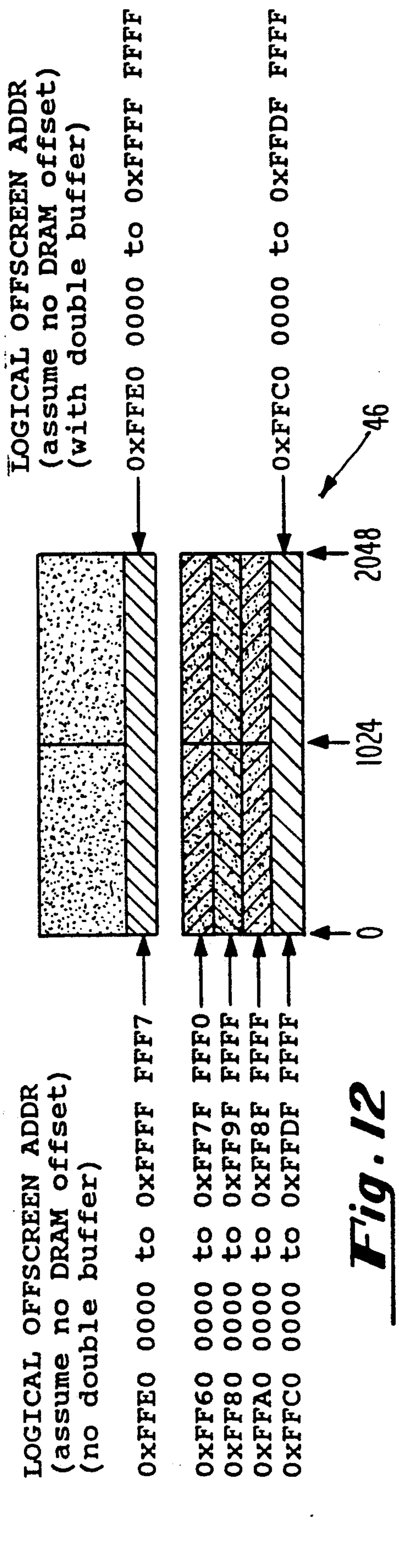
FIG. 12 is a diagrammatic view of information stored in the offscreen memory of FIG. 1 using the conversion chart of FIG. 11 when the memory is sized for a 1024×768×8 display.
Figure 13:
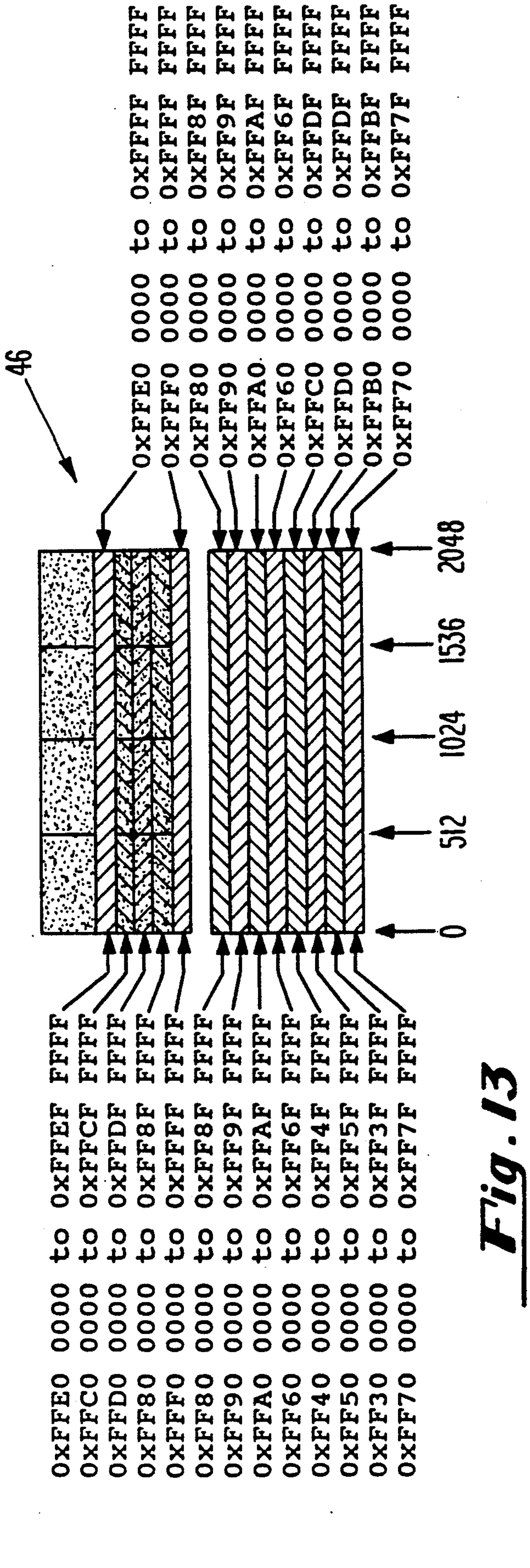
FIG. 13 is a diagrammatic view of information stored in the offscreen memory of FIG. 1 using the conversion chart of FIG. 11 when the memory is sized for a 1024×768×4 display.

A conversion chart is shown in FIG. 11 for use in converting the address portion of the information signal generated by processor 42 in order to remap those memory fragments contained in memory 46 constituting offscreen VRAM so that offscreen VRAM is accessible to processor 42 for linearly address format information. To this end, it is noted that column and row address locations 0 through 14 are passed straight through, while address positions 15, 16, 17 and 18 are decoded in accordance with the tables shown in FIG. 14. The use of either table is dependent upon whether the display is sized as a 1024×768×8 or as a 1024×768×4 display. In other words, in order to remap offscreen VRAM depicted in FIG. 12, the table in FIG. 14 which does not modify address position 15 is utilized. Consider the example where bit positions 18, 17 and 16 are represented as 110, respectively. In such a situation, PAL 44 remaps those bit positions to now be representative of 111, respectively. FIG. 13 is remapped in a similar fashion, however, address position 15 is also modified. The x's appearing in the tables indicate that "don't care" states to simplify the decoding equations.

It will again be noted that the remapping occurring in PAL 44 is transparent to the programmer and processor 42. As far as processor 42 is concerned the offscreen memory is simply a linear address space contiguous with any other local or DRAM memory such as memory 48. It is also noted that in the FIGS. 11–17 is it assumed that no DRAM memory is present.

FIG. 15 shows a conversion chart for use in converting the address portion of signals produced by processor 42 when the display has been sized as either a 1280×1024×4 or as a 1280×1024×8 display. It is again noted that address positions 15–18 are utilized to remap the offscreen VRAM. However, it will now be noted that positions 0 through 5 are utilized for the first six column address positions while address positions 6 through 14 are utilized for the eight row address positions. Positions 15, 16 and 17 are utilized to complete the remaining three column address information. Information appearing at address positions 15, 16, 17 and 18 is converted in accordance with the tables shown in FIG. 17. Use of the tables shown in FIG. 17 will result in the storage of information as depicted in FIG. 16.

Consider now that DRAM memory 48 does not have zero memory available, but rather, has one megabyte of local DRAM available. In such a situation, offscreen VRAM is addressed such that its locations are physically contiguous with memory 48. This result is achieved by off setting the first position in the remapped offscreen VRAM by the amount of DRAM memory which is available. If one megabyte of local DRAM memory were available, the top of the offscreen VRAM memory would be 0xFF7FFFFF instead of 0xFFFFFFFF.

It will be noted that in all configurations the offscreen VRAM memory is used up in STACK 0 before any memory is used in STACK 1. This is preferred, because STACK 1 is generally optional and may not be present in some graphic systems.

While the invention has been described and illustrated with reference to specific embodiments, those skilled in the art will recognize that modification and variations may be made without departing from the principles of the invention as described herein above and set forth in the following claims.

What is claimed is:

1. Apparatus for use in read/write operations by a processor, wherein said processor reads and writes information in first and second address formats, said first address format for the storage of display information and said second address format for the storage of other information, said apparatus comprising: a memory; and a memory mapper, connected to said memory and said processor, said memory mapper for remapping those memory fragments not containing information stored in said first address format so that said memory fragments are linearly addressable by said processor for reading and writing information in said second address format.

2. The apparatus of claim 1, further comprising a second memory, wherein said second memory is utilized for reading and writing information in said second address format, wherein said memory mapper remaps said memory fragments to be logically contiguous with said second memory.

3. The apparatus of claim 1, wherein said memory mapper remaps said memory so that those memory fragments not containing information stored in said first address format are.

4. The apparatus of claim 3, wherein said second format is a linearly addressable format and wherein said first format is a non-linearly addressable format said memory mapper remapping said memory fragments for linear addressing by said processor.

5. The apparatus of claim 4, wherein said first address format is x-y address format.

6. A graphics system comprising:

a graphics processor for generating first and second information signals, wherein said first and second information signals comprise digital words and wherein each of said digital words comprises an address portion, wherein the address portion associated with said first information signal is representative of a first address format and wherein the address portion associated with said second information signal is representative of a second address format;

a memory; and a memory mapper, connected to said memory and said graphics processor, for remapping those memory fragments not containing information stored in said first address format so that said memory fragments are linearly addressable by said processor for reading and writing information in said second address format.

7. The system of claim 6, wherein said memory mapper comprises a programmable array logic device.

8. The system of claim 6, wherein said memory mapper further remaps that portion of said memory where information is to be stored in said first address format so that said first information signal is stored in locations which are physically contiguous.

9. The system of claim 6, further comprising a second memory, wherein said second memory is utilized for reading and writing information in said second address format, wherein said memory mapper remaps said memory fragments to be logically contiguous with said second memory.

10. The apparatus of claim 9, wherein said second memory comprises DRAM memory.

11. The system of claim 6, wherein said memory comprises VRAM memory.

12. The system of claim 11, wherein said first information signal comprises display information and said second information signal comprises program information.

13. A method for use in read/write operations by a processing system which includes a processor, an addressable memory, and a memory mapper, wherein said processor reads and writes information in first and second address formats, said first address format for the storage of display information and said second address format for the storage of other information, said method comprising the steps of: remapping those memory fragments not containing information stored in said first address format so that said memory fragments are linearly addressable by said processor and writing information to said memory fragments in said second address format.

14. The method of claim 13, further comprising the step of providing a second memory, wherein said second memory is utilized for reading and writing information in said second address format, wherein said step of remapping comprises the step of remapping said memory fragments to be logically contiguous with said second memory.

15. The method of claim 13, wherein said step of remapping comprises remapping said memory so that those memory fragments not containing information stored in said first address format are physically contiguous.

16. The method of claim 15, wherein said second format is a linearly addressable format and wherein said first format is a non-linearly addressable format wherein said step of remapping those memory fragments not containing information stored in said first address format comprises remapping said memory fragments for linear addressing by said processor.

17. The method of claim 13, further comprising the step of providing a second memory, wherein said second memory is utilized for reading and writing information in said second address format, and further comprising the step of remapping those memory fragments not containing information stored in said first address format to be logically contiguous with said second memory.

18. A method for remapping memory fragments in a data processing system, which system includes a processor, an addressable memory and a memory mapper, said method comprising:

generating first and second information signals, wherein said first and second information signals comprise digital words and wherein each of said digital words comprises an address portion, wherein the address portion associated with said first information signal is representative of a first address format and wherein the address portion associated with said second information signal is representative of a second address format; and remapping those memory fragments present in said memory that do not contain information stored in said first address format so that said memory fragments are linearly addressable by said processor for reading and writing information in said second address format.

19. The method of claim 18, wherein said first information signal comprises display information and said second information signal comprises program information.

20. The method of claim 19, further comprising the step of remapping that portion of said memory where information is to be stored in said first address format so that said first information signal is stored in locations in said memory which are physically contiguous.

* * * * *